United States Patent
Thivierge et al.

(10) Patent No.: US 8,044,637 B2
(45) Date of Patent: Oct. 25, 2011

(54) BATTERY CHARGING METHOD

(75) Inventors: Daniel P. Thivierge, Warren, RI (US);
Albert R. Fredette, Wakefield, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 527 days.

(21) Appl. No.: 12/287,159

(22) Filed: Sep. 29, 2008

(65) Prior Publication Data
US 2010/0079116 A1   Apr. 1, 2010

(51) Int. Cl.
*H02J 7/00* (2006.01)
*H02J 7/04* (2006.01)

(52) U.S. Cl. ......... 320/116; 320/118; 320/119; 320/153

(58) Field of Classification Search ............ 320/116, 320/118, 119
See application file for complete search history.

(56) References Cited

U.S. PATENT DOCUMENTS

| | | | |
|---|---|---|---|
| 5,869,950 A * | 2/1999 | Hoffman et al. | 320/103 |
| 6,511,764 B1 * | 1/2003 | Marten | 429/7 |
| 7,755,326 B1 * | 7/2010 | Thivierge | 320/116 |
| 2007/0126400 A1 * | 6/2007 | Benckenstein et al. | 320/119 |

* cited by examiner

*Primary Examiner* — M'Baye Diao
(74) *Attorney, Agent, or Firm* — James M. Kasischke; Jean-Paul A. Nasser; Michael P. Stanley

(57) ABSTRACT

A charging and equalizing method for a battery having a control computer in a charging system in communication with a plurality of module processors. Charging and equalization pauses periodically for voltage measurement by the module processors. The control computer determines when to equalize battery cells in the modules based on their open circuit voltages transmitted by the module processors. A selected group of cells in each module can be equalized. Equalization is carried out in the modules until all of the module processors indicate that equalization has been completed. Charging can then resume until charging is complete or cells reach a maximum voltage given by the control computer. In an alternative embodiment, a selected group of cells may be partially bypassed while charging to reduce the charge rate of the cell.

14 Claims, 6 Drawing Sheets

BATTERY CHARGING METHOD

STATEMENT OF GOVERNMENT INTEREST

The invention described herein may be manufactured and used by or for the Government of the United States of America for Governmental purposes without the payment of any royalties thereon or therefore.

CROSS-REFERENCE TO RELATED APPLICATIONS

None.

BACKGROUND OF THE INVENTION (1) Field of the Invention

The present invention relates generally to a power management method for a modular battery.

(2) Description of the Prior Art

High power level rechargeable batteries are often necessary for specific applications. These batteries are made up of a plurality of series connected cells grouped in modules. In electric vehicle applications, batteries such as this are often capable of delivering in excess of 100 KW at a voltage of 400 VDC or above. A battery of this nature can have in excess of one hundred cells divided into individual modules or banks of cells.

A battery of this power level must be handled very carefully and monitored very closely during charge and discharge. This is particularly true of lithium ion batteries. The voltage of each cell must be monitored during discharge to ensure that no cell voltage is allowed to drop below approximately 2.1 VDC. Allowing a cell voltage below this level may cause irreversible damage to the cell. More importantly the voltage of each cell must be carefully monitored and controlled while charging overcharging a cell beyond approximately 4.3 VDC can result in catastrophic failure of the cell.

It is also desirable that all cells remain at the same voltage level, charge at the same rate, and reach the desired final voltage level at the same time. In practice, however, this is not the case; cell charge and discharge characteristics vary. All cells must be monitored very closely during charging. If any cell (or group of cells) reaches a predefined upper voltage limit prior to the rest of the cells, charging is suspended and the rogue cells must be discharged to the voltage level of the other cells. This process is referred to as "cell equalizing" or "cell equalization".

Monitoring battery temperature during charge and discharge is also very important. Cell temperatures should not be allowed to exceed a predetermined temperature. If this temperature is reached, corrective action must be taken immediately. This corrective action can include shutting down the charge or discharge process or activating a cooling system.

These problems are specifically acute when using lithium-ion batteries; however, other battery chemistries have similar problems. In view of the prior art, there is a need for a battery monitoring and charging system that allows full monitoring and control of the battery.

SUMMARY OF THE INVENTION

A charging and equalizing method for a battery having a control computer in a charging system in communication with a plurality of module processors. Charging and equalization pauses periodically to determine corrections for voltage measurement by the module processors. Cell voltages are continuously sampled and data is sent to the control computer periodically. The control computer determines when to equalize battery cells in the modules based on their open circuit voltages transmitted by the module processors. A selected group of cells in each module can be equalized. Equalization is carried out in the modules until all of the module processors indicate that equalization has been completed. Charging can then resume until charging is complete or cells reach a maximum voltage given by the control computer. In an alternative embodiment, a selected group of cells may be partially bypassed while charging to reduce the charge rate of the cell. This bypassing will reduce the amount of time spent equalizing and will significantly reduce the overall charge time.

BRIEF DESCRIPTION OF THE DRAWINGS

The foregoing invention will become readily apparent by referring to the following detailed description and the appended drawings in which.

DETAILED DESCRIPTION OF THE INVENTION

Figure 1:
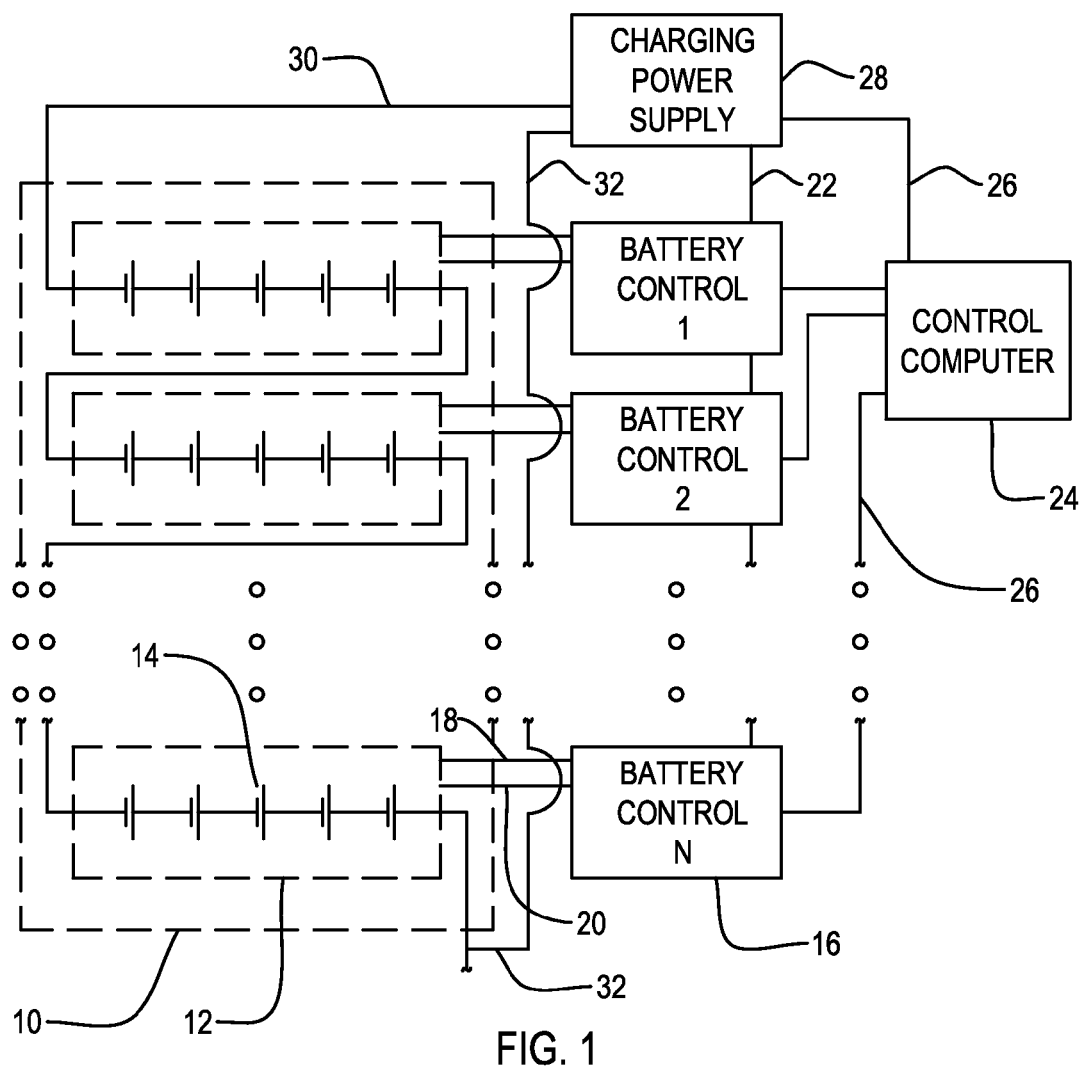
FIG. 1 is a diagram providing an overview of an embodiment of the device and the associated battery.

This embodiment provides a method for controlling a battery charging system. One possible battery monitoring and charging system is provided in FIG. 1, FIG. 2, FIG. 3, and FIG. 4. This embodiment is disclosed in U.S. patent application Ser. No. 11/831,197, filed on 31 Jul. 2007 which is incorporated by reference herein. The battery 10 is subdivided into a plurality of battery modules 12 each having a plurality of cells 14. Each module 12 has a battery control board 16 associated with that module 12. Each battery control board 16 has multiple temperature monitoring connections 18, multiple cell connections 20 used for cell voltage monitoring and cell equalization, and a power relay connection 22. Internal connections within module 12 and battery control board 16 will be shown hereinafter. Module 12 is only defined by its connection to a single battery control board 16, and module 12 can have as many cells 14 as battery control board 16 can monitor. The battery control boards 16 are joined to a control computer 24 by a network 26. For identifying the separate control boards 16 to the control computer 24, each board 16 has a dip switch, memory, or other means for giving it a unique network address. This network 26 can be Ethernet™, wi-fi or any other networking technology. The charge control computer 24 provides coordination and control of the modules during discharge and charging. In order to charge battery 10, there is a charging power supply 28 joined to network 26 and control computer 24. Charging power supply 28 is further joined to power relay connection as discussed with relation to FIG. 3. Charging cables 30 and 32 are connected to the low and high side of battery 10, respectively.

Figure 2:
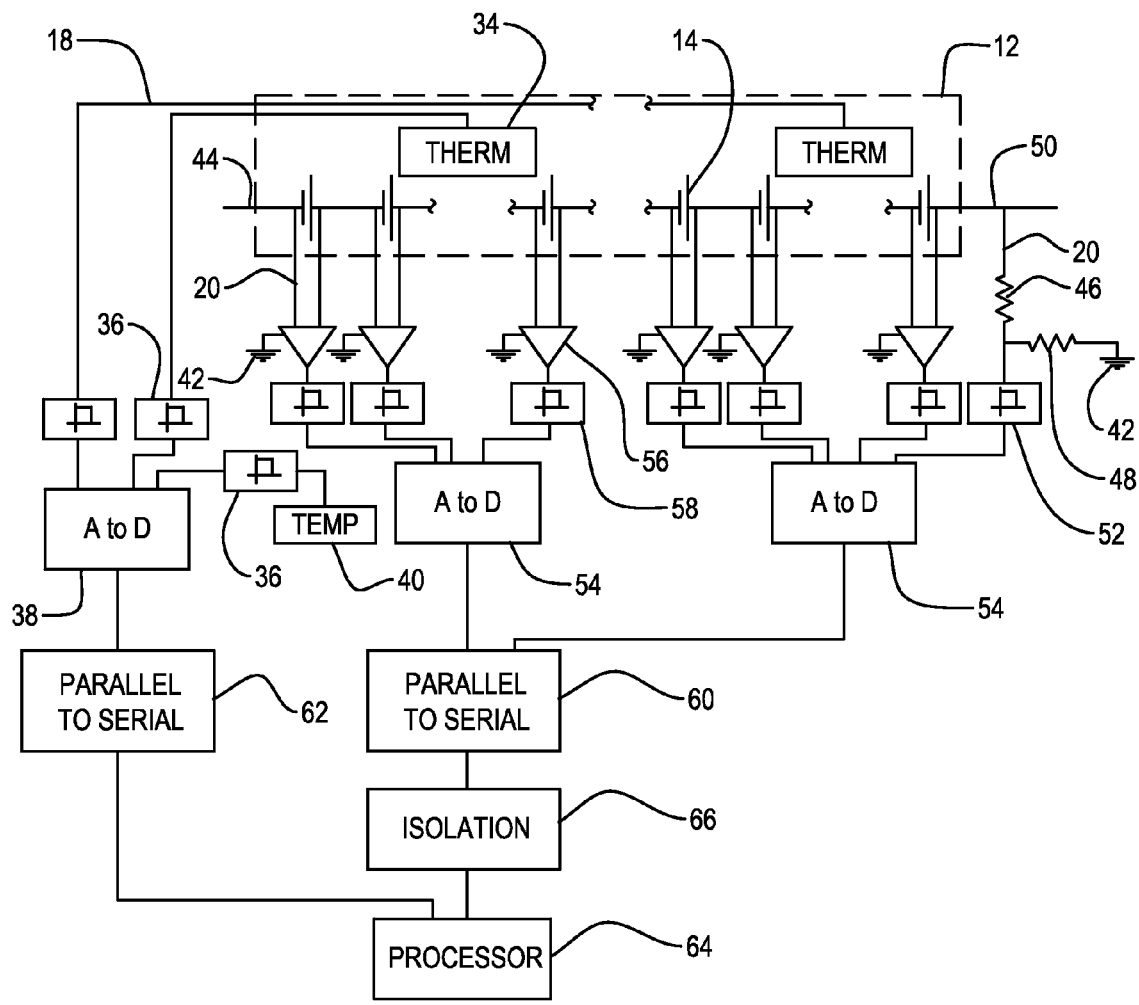
FIG. 2 is a diagram showing the battery monitoring functions of the battery control board.

FIG. 2 shows an embodiment of the voltage and temperature monitoring aspects of the battery control board 16. As discussed above, each battery control board 16 is joined to a group of cells 14 arranged in a module 12 of battery 10. Board 16 is joined to monitor the temperature of cells 14 in the module by thermistors 34 joined within module 12. Thermistors 34 are dispersed among cells 14 to monitor their temperatures and are joined to temperature monitoring connection 18. Each thermistor 34 is connected to a low pass filter 36 for reducing noise in the temperature signal. The outputs of low pass filters 36 are joined to a multi-channel temperature analog to digital converter 38. At least one board temperature sensor 40 is also joined to the temperature analog to digital converter 38 through low pass filter 36. Board temperature sensor 40 provides the local temperature of the battery control board 16 and of the equalization circuitry, shown in FIG. 4, which is installed on control board 16. This embodiment is capable of utilizing as many thermistors 34 and temperature sensors 40 as necessary to monitor module 12. As such, this disclosure should not be limited by the number of thermistors or sensors shown. Furthermore, other temperature sensing devices can be used in place of thermistors. These include thermocouples and other temperature sensing components.

Voltage monitoring connection 20 is required to monitor the voltage in each cell 14 as well as the overall voltage of the module 12. Ground 42 for these purposes is the lowest voltage in module 12. This is the voltage identified at 44. In view of the series arrangement of battery 10 and modules 12, ground 42 for the specific module 12 could be well above the base voltage of battery 10. Components of the embodiment must be capable of operating with these voltage differentials. The overall voltage of the module 12 is measured by a voltage divider utilizing resistors 46 and 48 set up between the highest voltage in the module 12 and the ground 42. The highest voltage for module 12 is that at point 50. The voltage divider is connected to the input of an op amp configured as a low pass filter 52 for reducing noise in the overall voltage measurement. The filter output is connected to a voltage analog to digital converter 54.

Cell voltages are measured by joining voltage monitoring connection 20 on both sides of each cell 14. The voltage between the high voltage and low voltage of each side of cell 14 is measured by a differential amplifier 56. Differential amplifier 56 can be any differential amplifier having a common mode voltage rating capable of handling the highest voltage 50 in the module 12. The output of the differential amplifier 56 is connected to voltage analog to digital converter 54 through a low pass filter 58. Differential amplifiers 56 convert the various differential measurement common mode cell voltage levels present in the module and reference them all to a common ground 42 preventing these voltages from adversely affecting analog to digital converter 54. Low pass filters 58 eliminate high frequency noise that may be present on the cell voltage signals. Low pass filters 58 can be implemented as two pole active low pass filters or as a passive low pass filters. Cutoff frequency of these filters 58 should be chosen as is necessary to eliminate high frequency noise.

As described above, filtered voltage measurements from the cells and the overall module voltage divider output are provided to one or more voltage analog to digital converters 54. The number of converters 54 is dictated by the number of cells 14 in module 12 and the number of channels in each analog to digital converter 54. The digital output of voltage analog to digital converters 54 is serialized by a parallel to serial interface 60. Temperature analog to digital converter 38 are serialized by a separate parallel to serial interface 62 because analog to digital converter 38 operates at the same ground level as the processor 64 and does not require isolation. Interfaces 60 and 62, which may be integral to the analog to digital converter, convert signals from the analog to digital converters into a serial form that can be interfaced to the serial interface of processor 64. The function of processor 64 can be implemented using a wide range of digital signal processors, microcontrollers, or microprocessors. The serial output of interface 60 is isolated from processor 64 by an isolator 66. Isolator 66 allows the processor 64 to operate at a common, system wide, ground rather than the module specific ground 42 discussed above. This allows the processors 64 from all control boards 16 to be powered from a single power supply.

Figure 3:
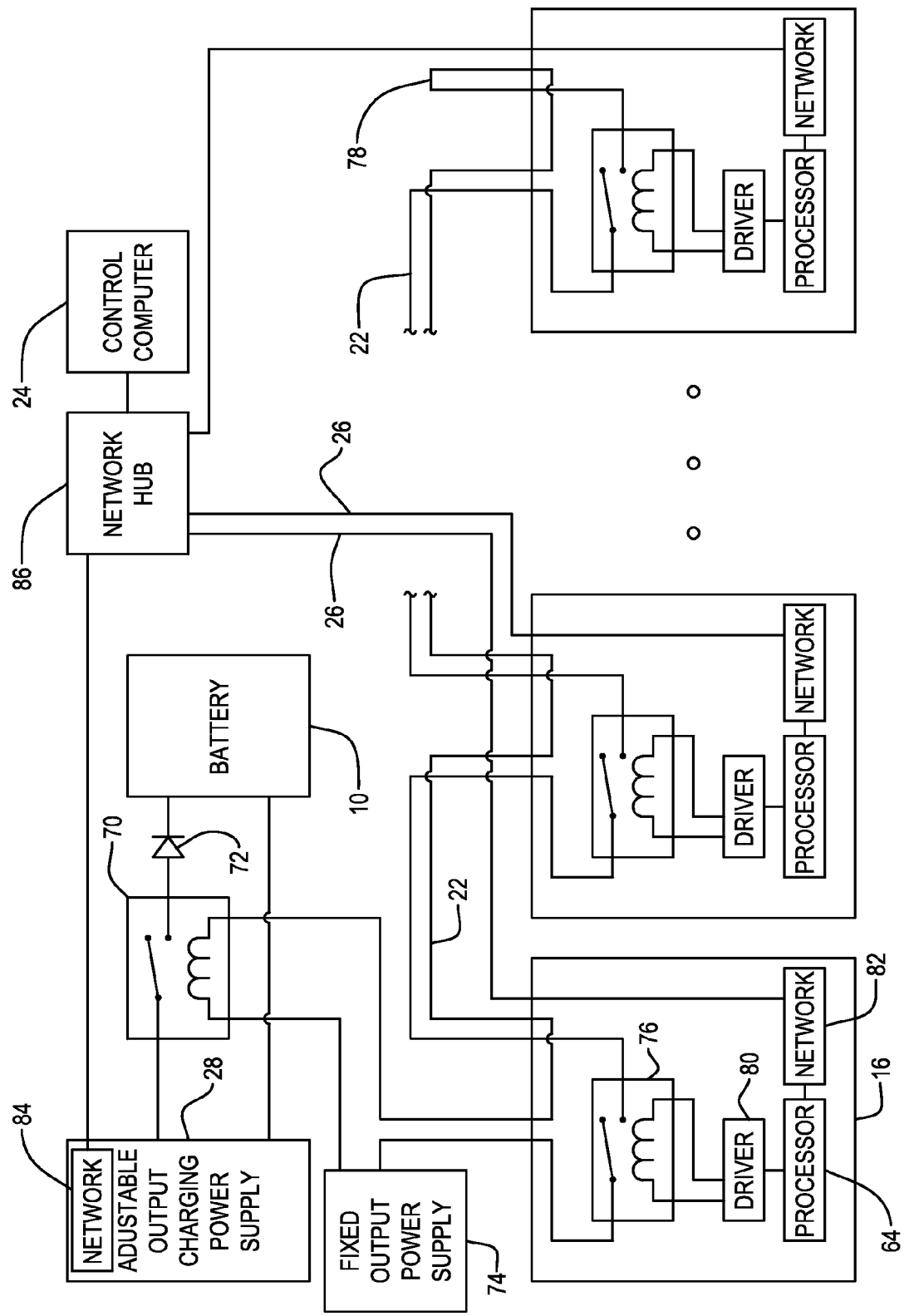
FIG. 3 is a diagram of the relay control apparatus for suspending battery charging in the event of a system fault or at charge completion.

FIG. 3 shows power relay control connection 22 that switches voltage to battery 10 during charging. Control computer 24 is joined by network 26 to each board 16 for controlling power distribution during charging and equalization. Control computer 24 is also joined by network 26 to an adjustable output charging power supply 28. Charging power supply 28 is joined to charge battery 10 through a main power relay 70 and blocking diode 72 which prevents current from flowing from the battery back to the power supply 28 when the power supply 28 is turned off. The control coil of main relay 70 is energized by a fixed output power supply 74. The control coil of main relay 70 and the fixed output power supply 74 are in series with a board relay 76 on each of the battery control boards 16. If any one of the relays 76 is open then relay 70 is open and power supply 28 is disconnected from battery 10. In the embodiment shown, power relay control connection 22 on boards 16 are connected in a series as a bus with the last connection having a terminator 78. In other embodiments, the boards 16 could be connected directly in series with the last board being connected directly to relay 70 instead of through each board 16, as shown.

On each board 16, board relay 76 is connected to processor 64 through a driver 80. Driver 80 is provided merely for giving the required control power for relay 76 and may not be necessary in some embodiments. Processor 64 is further connected to a network driver 82 in communication with network 26. Processor 64 can control board relay 76 when it receives a command from control computer 24 or when it detects a fault through the sensors provided in relation to FIG. 2.

Adjustable output power supply 28 has a network driver 84 installed to communicate with network 26. This allows control computer 24 to disable the adjustable output power supply 28 in case of fault or equalization. Network 26 is joined to a network hub 86. Control computer 24 is joined to network hub 86 through network 26.

Figure 4:
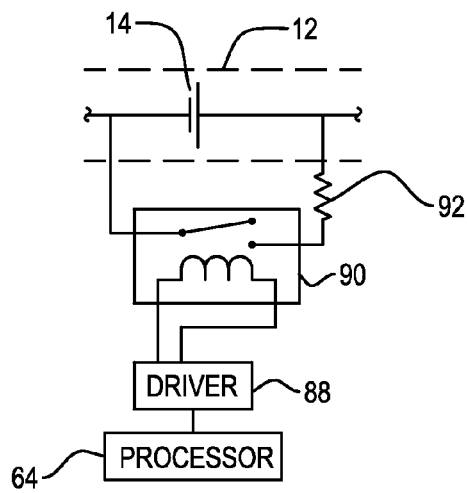
FIG. 4 is a diagram of the cell equalization and partial bypass circuitry.

FIG. 4 shows the circuitry necessary to equalize or partially bypass a cell 14 in a module 12. Equalization is necessary when a cell 14 charges too fast and reaches a predefined upper limit before the rest of the cells 14. This is detected first by the cells monitoring circuit board 16 and is communicated by board 16 to control computer 24 through network 26. This equalization process is achieved by first opening main relay 70 thereby disconnecting power supply 28 from battery 10. Processor 64 controls the main relay 70 by controlling its associated board relay 76. Processor 64 then sends a signal to equalization driver 88 which activates equalization relay 90. Equalization relay 90 isolates processor 64 from ground 42. Activation of equalization relay 90 places an equalization resistor 92 in parallel with cell 14. Equalization relay 90 can be a photovoltaic relay, reed relay or other type of switch having the appropriate activation energy, current, isolation, and voltage ratings. Processor 64 monitors equalization voltage through voltage monitoring circuitry shown in FIG. 2 until cell 14 voltage has been reduced to the desired level communicated by control computer 24. Each cell 14 has its own equalization relay 90 and power resistor 92. Once the cell or cells that were selected for equalizing have all reached the desired final voltage, all equalization relays 90 are opened, board relays 76 and main relay 70 are closed and charging resumes. This circuitry is also used to partially bypass charge current around the cell while charging. In order to partially bypass, relay 90 closes in response to a signal received by processor 64 while cell 14 is being charged. Closing relay 90 shunts a portion of the charging current through relay 90 and resistor 92. This bypassing will reduce the rate of voltage increase or charge rate of the cell significantly reducing the amount of time spent equalizing and the overall charge time.

This embodiment features multiple layers of redundant fault sensing and control that are designed into the device. When charging, control computer 24 can be an external computer in constant communications with battery control boards 16 and with power supply 28 which has its own network interface 84. Control computer 24 commands the power supply 28 voltage to 0 VDC and disables power supply's output 28 if it receives cell voltage or temperature data from one of the battery control boards 16 that is out of acceptable range specified by the user. Control computer 24 also disables power supply 28 if it loses communication with any of the battery control boards or receives a fault message from one of the boards.

The processor 64 on each battery control board is programmed to sample cell voltages and temperatures several times a second. Processor 64 compares these cell voltages to high and low voltage limits defined by the user and communicated to the processor 64 through a graphical user interface on control computer 24. The graphical user interface can display cell voltage, module voltage, module temperatures and board temperatures. The graphical user interface can also provide user control for charging and equalization. Each processor 64 controls board relay 76 that controls the coil of main relay 70. The voltage controlling main relay 70 and passing serially through board relays 76 on boards 16 is supplied from an external fixed output power source 74. All processors 64 must close their respective board relays 76 in order for power to be applied to the main relay 70 that electrically connects the charge power supply 28 to the battery 10. If any of the processors 64 senses a fault condition or loses communication with the control computer 24, that processor 64 will command its board relay 76 to open which will also open the main relay 70 disconnecting the charge power supply 28 from the battery 10.

Battery charging and/or equalizing is globally controlled by the control computer 24 and is based on information received from all battery control boards 16 in the system. The host control computer 24 synchronizes the battery control boards 16 so that they will all start charging and equalizing simultaneously. Equalizing has a higher priority than charging. If any cell 14 in any module 12 reaches the final charge voltage dictated by the control computer 24, the battery control board 16 monitoring that cell 14 tells the control computer 24 that it is ready to equalize. The battery control board 16 then waits for an equalization command from the control computer 24. Control computer 24 then commands all battery control boards 16 to stop charging and start equalizing. Control computer 24 synchronizes this transition from charging to equalizing on all battery control boards 16 so that a given board 16 will not start equalizing while other boards 16 think the system is charging.

The control computer 24 also dictates the absolute maximum number of cells 14 each battery control board 16 should equalize at any one time to limit the amount of heat being generated by resistors 92 on the battery control boards 16.

Once every minute, processors 64 suspend equalization for several seconds by opening the equalize relays 90 and take an open-circuit cell voltage measurement. This open-circuit cell voltage measurement is used to calculate an equalization voltage offset that is applied to the cell voltage measurements taken while equalizing. Processor 64 then sorts the open-circuit cell voltage data in order from highest voltage to lowest voltage, and determines which cells exceed the desired end-equalization voltage level dictated by the control computer 24. The battery control board 16 then resumes equalizing as many of the highest voltage cells as it can based on the maximum number of cells to equalize command received from the control computer 24.

After one of the battery control boards 16 indicates that it is time to equalize, the control computer 24 determines which cell 14 from the all the modules 12 is at the lowest voltage. The control computer 24 then adds a user defined offset to this lowest cell voltage reading and communicates this voltage value to all module processors 64 as being the end-equalization voltage level. During equalization, a cell whose voltage is below the end-equalization voltage level is masked out and will not be allowed to equalize again until after the next charge cycle. Equalization continues until all cells of all modules have fallen below the end-equalization voltage level and been masked out.

Figure 5:
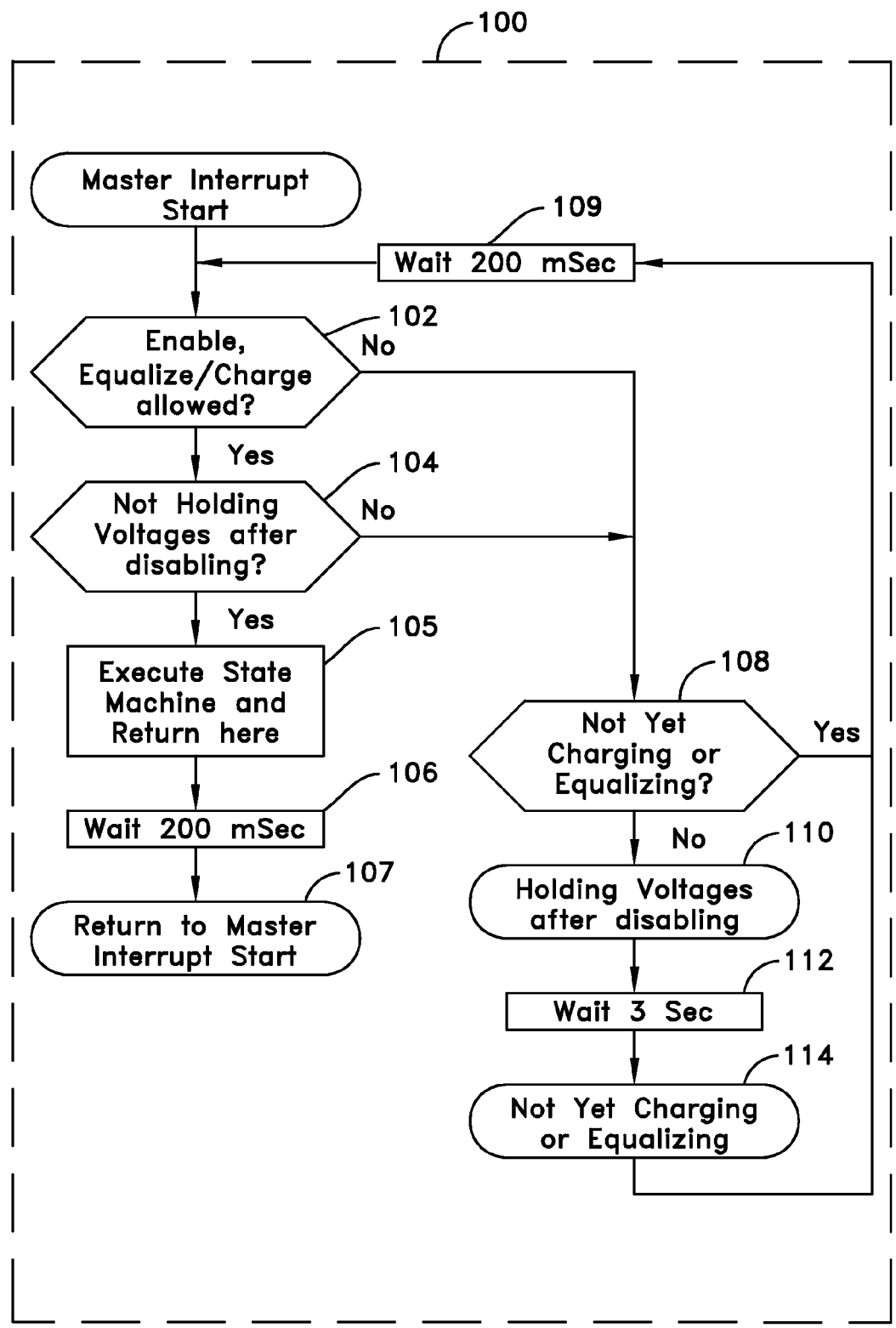
FIG. 5 is a flow chart of a master interrupt routine used in an embodiment of this invention.
Figure 6A:
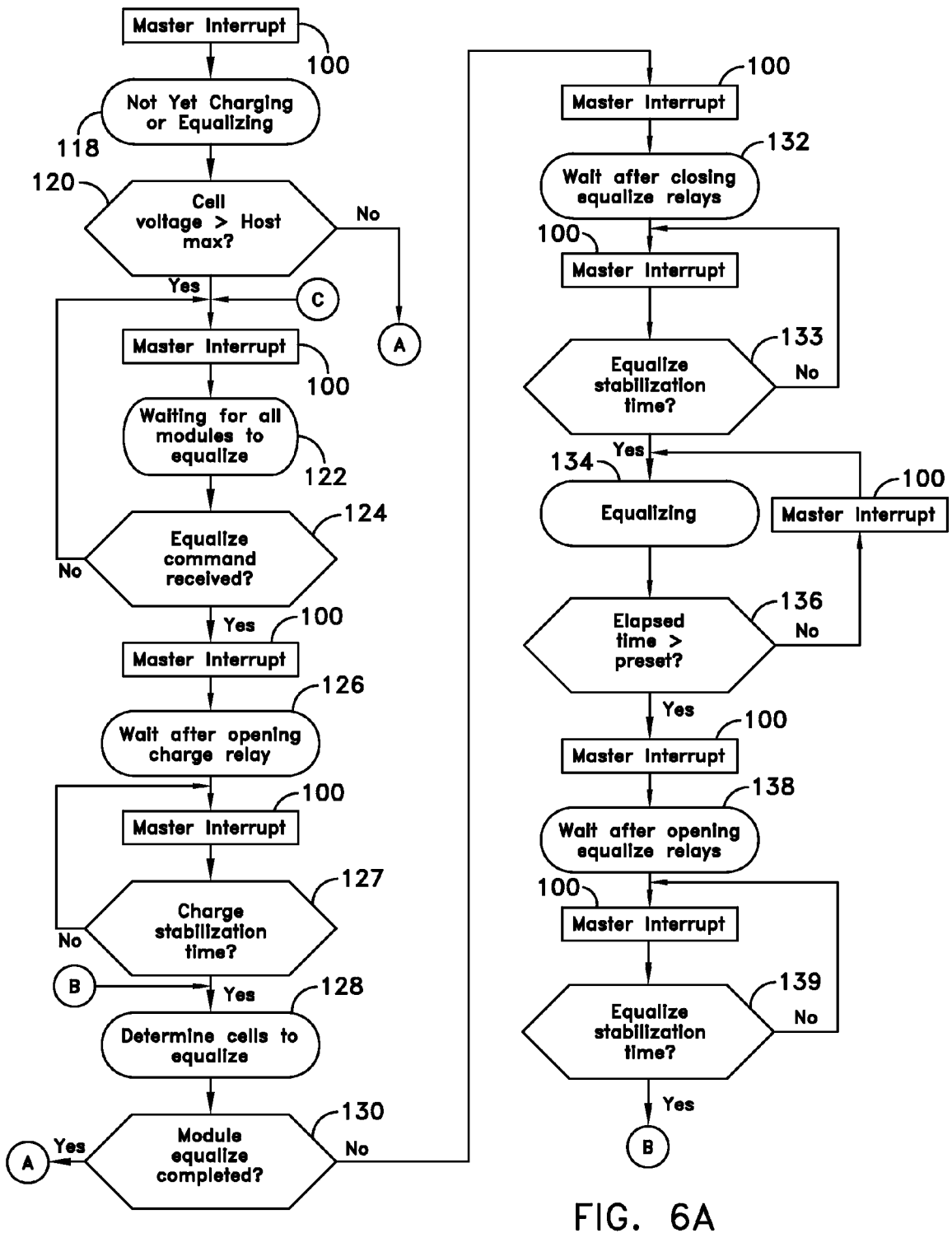
FIG. 6A is a flow chart of equalizing operations used in an embodiment of this invention.
Figure 6B:
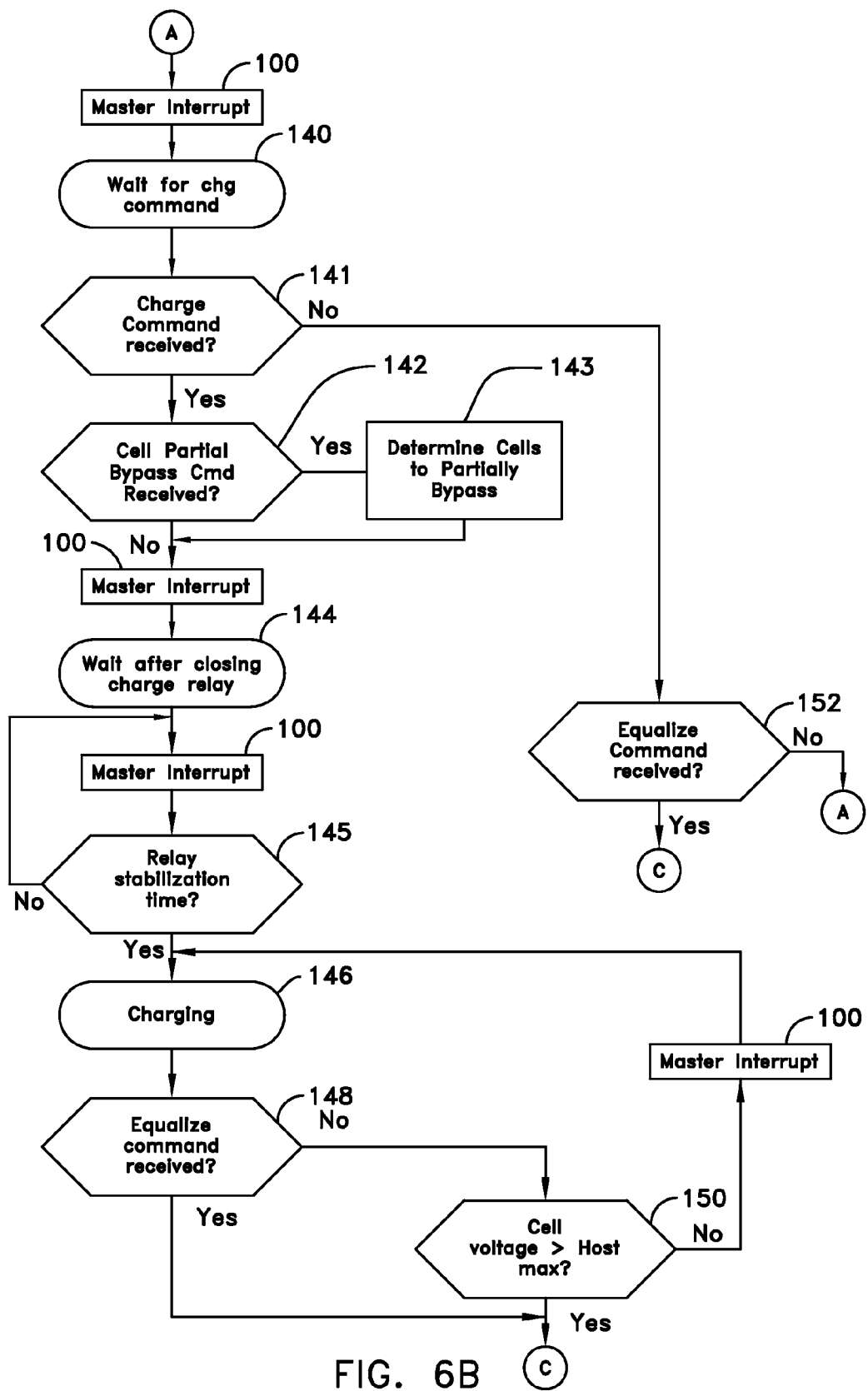
FIG. 6B is a flow chart of charging operations used in an embodiment of this invention.

FIGS. 5, 6A and 6B show the method as run on a processor 64 for charging and equalizing a battery module 12. FIG. 5 concerns the master interrupt procedure that controls the charging and equalization procedures. FIG. 6A is specifically focused to the operation of equalizing battery cells in a module. FIG. 6B is specifically focused on the operation of charging battery cells in a module. The master interrupt procedure (FIG. 5) is executed in each master interrupt block. The return state is saved by the control computer so that the next state machine step can be executed.

The charge and equalize functions are implemented in a software state-machine. The software state machine has states that include: Not Yet Charging or Equalizing, Waiting for Host Command to Charge, Wait After Closing Charge Relay, Charging, Waiting for Host Command To Equalize, Waiting for All Modules Ready to Equalize, Wait After Opening Charge Relay, Deciding Which Cells to Equalize, Wait After Closing Equalize Relays, Equalizing, Wait After Opening Equalize Relays, and Holding Voltages After Disabling. Each state also provides an indication of the next state for the routine. Each of these states will be described in the following text.

Concerning the state "Not Yet Charging or Equalizing", this is the first state after processor 64 has received a charge enable command from control computer 24. All control boards 16 will receive this command at the same time. In this state, processor 64 decides whether the associated module 12 should be charged or equalized. As part of this state, the processor 64 reads cell voltages and stores the last cell voltage measurement as the open circuit voltage for the cell. This state will be followed by either the "Waiting for Host Command to Equalize" state or the "Waiting for Host Command to Charge" state. The "Waiting for Host Command to Equalize" state will follow if any cell voltage exceeds the cell upper charge limit provided by the control computer 24.

The "Waiting for Host Command to Charge" state instructs processor 64 to wait for permission from control computer 24 to charge. This state allows the control computer 24 to synchronize all control boards 16 and prepare them for charging or override the request to charge with a command to equalize. Again, the last cell voltage measurement is stored as the open circuit voltage for the cell 14 prior to closing the main power relay 70. In the embodiment allowing partial bypass, the control computer 24 also dictates the absolute maximum number of cells 14 each battery control board 16 should bypass at any one time to limit the amount of heat being generated by resistors 92 on the battery control boards 16. Processor 64 then sorts the open-circuit cell voltage data in order from highest voltage to lowest voltage, and determines which cells exceed the desired partial bypass threshold voltage level dictated by the control computer 24. The battery control board 16 then resumes charging as many of the highest voltage cells as possible based on the maximum number of cells to bypass command received from the control computer 24. This state will be followed by the "Wait After Closing Charge Relay" state or the "Waiting for Host Command to Equalize" state depending on the control computer 24 command. If control computer 24 issues a charge command, processor 64 will close its charge relay 76.

The "Wait After Closing Charge Relay" state waits for the power supply 28 to reach its charging voltage and current and for cells 14 to settle out at their higher charge voltage. In the current embodiment, the time for waiting is three seconds. During this state the same battery cell voltages as those obtained in the prior state are sent to control computer 24. The next state is "Charging" after processor 64 has spent the predetermined time in the "Wait After Closing Charge Relay" state.

In the "Charging" state, processor 64 monitors cell voltages to insure that they do not exceed a maximum voltage value provided by control computer 24. While in this state, the control computer 24 periodically disables charging for several seconds which opens the charge relays 70 allowing processors 64 to take an open-circuit cell voltage measurement. After several seconds have elapsed, the control computer 24 re-enables charging, and the processor will return to the charging state after passing through the "Waiting for Host Command to Charge" and "Wait After Closing Charge Relay" states. The open-circuit cell voltage measurement is used to calculate a charge voltage offset that is applied to the cell voltage measurements taken while charging to determine the actual cell voltage. This adjusted or actual cell voltage is then used to determine if any cell voltage in the associated module 12 has exceeded the maximum voltage value. If a cell voltage has exceeded this value, processor 64 notifies control computer 24, charging is stopped, the charge relay is opened, and the processors 64 wait 3 seconds for the cell voltages to stabilize in the "Holding Voltages after disabled" location prior to proceeding to the "Not Yet Charging or Equalizing" and then "Waiting for Host Command to Equalize" states.

In the embodiment allowing partial bypassing of the cells, control computer 24 can send a partial bypass command to battery control board 16 indicating the cell or cells for partial bypassing. Processor 64 associated with battery control board 16 closes relay 90 thereby shunting current around cell 14. This slows the charge rate for the cell being subjected to the shunting.

During the "Waiting for Host Command to Equalize" state, processor 64 waits for permission from control computer 24 to equalize. This state tells control computer 24 that the associated module 12 is ready to equalize, and that control computer needs to synchronize all other control boards 16 for equalization of their modules 12. During this state, battery cell voltages are not updated and previous values are sent to the control computer 24.

The "Waiting for All Modules Ready to Equalize" state is a waiting state for control board 16 to wait for an indication from control computer 24 that all modules 12 are ready to equalize. This state is needed for synchronization of the control boards 16. During this state, battery cell voltages are not updated and previous values are sent to control computer 24. This state is followed by the "Wait After Opening Charge Relay" state or additional waiting periods.

The "Wait After Opening Charge Relay" state waits for a preset period for cell voltages to settle out after removing the charging power supply 28 from the module 12 by opening board relay 76. In the current embodiment, this preset period is ten seconds. After the first three seconds, processor 64 starts sending actual battery cell voltages to control computer 24. This optional step allows monitoring of the settling process by control computer 24. This state is followed by the state of "Deciding Which Cells to Equalize".

In the "Deciding Which Cells to Equalize" state processor 64 stores the last cell voltages as the open circuit voltages of the cells 14. These voltages are then sorted to determine which cells 14 should be equalized. Cells having a voltage below an equalization target voltage set by control computer 24 are prevented from equalizing. All of the remaining cells 14 may not be able to equalize at once because of thermal dissipation issues, so a maximum number of cells 14 for equalization is provided by control computer 24. Processor 64 selects the maximum number of cells 14 requiring equalization with preference given to the cells 14 having the greatest voltage. If no cells require equalization, the next state is "Wait for Host Command to Charge".

The "Wait After Closing Equalize Relays" state waits for a preset period or time for cell voltage readings to stabilize at their new equalize values. In the current embodiment this preset period has been found to be 3 seconds. The cell voltages were determined in the "Deciding Which Cells to Equalize" state. The "Equalize" state occurs after this state.

In the "Equalizing" state, equalize offsets are calculated by subtracting the open circuit voltage (obtained in the "Deciding Which Cells to Equalize" state) from the current cell voltage measurement taken the first time through the "Equalizing" state. These equalize offsets are applied to all measured cell voltages for the remainder of the "Equalizing" state. During this state, cells 14 are equalized by reducing energy in the cells 14. In the current embodiment, this is done by placing equalizing resistor 92 in circuit with the equalizing cell 14 by closing equalization relay 90. Processor 64 obtains new equalize offsets every minute in the current embodiment. After the required time equalizing, the equalization relay 90 is opened, and the next state is "Wait After Opening Equalize Relays."

The "Wait After Opening Equalize Relays" state waits for cell voltage readings to settle out at their open circuit values. Waiting time is three seconds in the current embodiment. After accomplishing this, the open circuit cell voltages are sent to control computer 24. The next state is "Deciding Which Cells to Equalize" as preparation for another round of equalizing.

The state "Holding Voltages After Disabling" is entered into after termination of charging or equalizing. This state is executed during the master interrupt procedure. Battery voltages are not updated during this state, so that they can return to their open circuit values. The state "Not Yet Charging or Equalizing" follows this state.

FIG. 5 provides a flowchart of a master interrupt step 100. The state of the state-machine is reevaluated during the master interrupt phase 100 that occurs every 200 msec. This master interrupt phase interval is achieved through the use of a software timer in the processor 64 which is configured to generate an interrupt every 200 msec. The charge and equalize functions are implemented in this processor interrupt service routine. These functions will only be executed if there are no faults. Typical faults could be equalize failure after a predetermined time has elapsed, charge failure after a predetermined time has elapsed, excessive module or board temperatures or the like. The absence of a fault is indicated by an enable signal from control computer 24 indicating that conditions are acceptable for equalization or charging.

In view of this, step 102 considers actions to be taken if the battery control board 16 is enabled by the processor.64 and allowed to equalize or charge. In the physical embodiment shown in FIG. 3, enablement is embodied by control line 22 and enacted by board relays 76 and main relay 70. Step 104 considers coordinating signals from control computer 24 indicating if the control system is not in the "Holding Voltages After Disabling" state. If both steps 102 and 104 are positive then in block 105 the master interrupt returns to the location in the state machine before the master interrupt routine was called. At the next master interrupt call 100, the state machine returns to the wait 200 mSec step at 106. Control then returns to master interrupt start at step 107. If either step 102 or step 104 is negative, the software state machine tests to determine if the state machine is charging or equalizing in step 108. If the machine is not yet charging or equalizing, it waits for a predetermined period in step 109, 200 mSec in the current embodiment, and then returns to step 102. If the machine is charging or equalizing when the disable command is received from the control computer 24, then the state is changed to "Holding Voltages after Disabling" in step 110 and the machine waits for 3 seconds in step 112. This state allows cell voltages to stabilize to their open-circuit values after opening the charge relay. After waiting in step 112, the machine changes state to "Not Yet Charging or Equalizing" in step 114 and control passes to step 109.

FIG. 6A shows an embodiment of the method as related to equalizing operations. The processor starts in the master interrupt and proceeds to the "Not Yet Charging or Equalizing", step 118. Before it can leave this state, the processor must find that one cell voltage exceeds the maximum cell voltage provided by the control computer. This is done in step 120. If one of the monitored cell's voltage exceeds the provided voltage, the processor executes the master interrupt routine and proceeds to the state "Waiting for All Modules to Equalize" in step 122. As shown in step 124, the processor remains in this state until it receives a command from the control computer indicating that equalization is allowable because all battery controllers are ready. The processor then opens the charge relay 76. Another master interrupt is executed. In step 126, the processor waits after opening the charge relay to allow voltage in the associated cells to stabilize. Step 127 repeats master interrupt 100 until a predetermined delay time elapses allowing stabilization. This can be implemented by using a counter, iterating the 200 mSec master interrupt delay fifty times. The processor determines which cells to equalize in step 128. This is done by sorting the voltages obtained from all of the cells associated with the processor. The processor prevents cells having a voltage below an equalization target voltage set by control computer 24 from equalizing. The control computer also submits a command telling processor 64 the number of cells that can be allowed to equalize at once because of thermal dissipation issues. Processor 64 selects the maximum number of cells 14 requiring equalization with preference given to the cells 14 having the greatest voltage. In step 130, equalization is stopped in the associated module if all cells are equalized. If processor 64 determines that cells must be equalized, it executes the master interrupt routine and proceeds to step 132. Step 133 shows implementation of a waiting period after closing the equalize relays to allow voltages to stabilize in the equalizing cells. Preferably, step 133 iterates master interrupt fifteen times, giving a 3 second delay. The processor 64 proceeds to the equalizing step 134. In the equalizing step 134, the processor 64 waits for an elapsed time to pass in step 136 and periodically executes the master interrupt for synchronizing the control boards. After the elapsed time has passed, the processor executes the master interrupt and opens the equalize relays. In steps 138 and 139, the processor waits after opening the equalizer relays and executes another master interrupt. Step 139 preferably iterates master interrupt 100 fifteen times. After this delay, processor 64 loops back to step 128 to undergo another round of equalization steps.

FIG. 6B shows an embodiment of the method as related to charging operations. This begins by executing the master interrupt step 100 discussed in FIG. 5. The processor then waits for a charge command from the control computer in step 140. This coordinates the battery control boards. Step 141 is a control step directing action when a charge command is received from control computer 24. After receiving the charge command, in step 142 the processor checks to see if a partial bypass command has been received. Step 143 is executed for the partial bypass command. In this step processor 64 receives the absolute maximum number of cells 14 from control computer 24 that each battery control board 16 should bypass at any one time to limit the amount of heat being generated by resistors 92 on the battery control boards 16. Processor 64 then sorts the open-circuit cell voltage data in order from highest voltage to lowest voltage, and determines which cells exceed the desired partial bypass threshold voltage level dictated by the control computer 24. The battery control board 16 then resumes charging. In any case, the processor 64 proceeds to step 144 after executing a master interrupt 100.

In step 144, the processor closes the charge relay and waits for cell voltages to stabilize. If no charge command is received in step 141, control proceeds to step 152 for determining if the system is ready to equalize. If the system is not ready to equalize, after executing a master interrupt, it returns to the beginning of the charge procedure and executes step 140, wait for charge command. If the system is ready to equalize, it executes a master interrupt and proceeds to step 122, waiting for all modules to equalize.

The specification shows the battery charging method with respect to one specific type of battery. It should be understood that this method allows many different kinds of apparatus. For example, the battery can have only one module. Equalization can be performed by a different method such as by reusing the discharged energy. The battery can have any number of cells. Times given above are tied to the specific equipment. Different equipment will require different times. Communication between modules and control computer can be by any means known in the art.

It is to be understood that the foregoing description and specific embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

What is claimed is:

1. A charging and equalizing method for a battery having a control computer in a charging system in communication with a plurality of module processors, said module processors being associated with a module of cells of the battery, said method comprising the steps of:

said module processor isolating the module from the charging system;

said module processor monitoring voltages at each of the associated cell of the module of cells while the module is isolated;

said module processor providing the monitored voltages to the control computer;

said control computer receiving cell voltages from monitoring voltage by each module processor;

said control computer calculating a maximum cell voltage based on the cell voltages provided by the module processors;

said control computer providing said maximum cell voltage to said module processors prior to sending one of an equalize command and a charge command;

said module processor providing a requires equalization signal to the command computer when one associated cell has voltage above said maximum voltage established by the control computer;

said control computer sending a prepare for equalization command to said module processors after receiving said requires equalization signal from one said module processor;

said module processor waiting for one of a prepare to equalize command and a prepare to charge command from said control computer;

said control computer sending an equalization command to said module processors after receiving a prepared for equalization signal from said module processors;

said module processor determining which associated cells to equalize based on the monitored voltage at each of the associated cells;

said module processor equalizing the determined cells in the module for a predetermined period of time;

said module processor determining when the module has been completely equalized based on the monitored voltage at each of the associated cells;

said control computer awaiting receipt of an equalization complete signal from each of said module processors;

said module processor waiting for another command after determining that the module has been completely equalized;

said control computer providing a prepare to charge command to said module processors;

said module processor waiting for a prepare to charge command when voltage at one of the associated cells is below a predetermined voltage;

said control computer providing a charge command to said module processors after receiving a prepared to charge command from said module processors;

said module processor charging the associated cells after receiving a charge command from the command computer;

said control computer continuing charging while the module processors indicate that cells are below a predetermined voltage and a requires equalization signal has not been received; and said module processor halting charging of associated cells when a prepare to equalize command is received from the command computer and when one of the associated cells exceeds the maximum cell voltage;

wherein the step of determining which associated cells to equalize comprises the steps of:

sorting said associated cells by voltage;

selecting associated cells that exceed the maximum cell voltage level wherein the number of selected cells does not exceed the determined number of associated cells for equalization; and equalizing said selected cells during the step of said module processor equalizing the cells.

2. The method of claim 1 wherein said step of selecting associated cells selects cells exceeding said maximum cell voltage by the greatest amount before selecting associated cells exceeding said maximum cell voltage by lesser amounts.

3. The method of claim 1 wherein said step of sorting said associated cells and selecting said associated cells is performed by said control computer.

4. The method of claim 1 wherein said step of sorting said associated cells and selecting said associated cells is performed by said module processor.

5. A charging and equalizing method for a battery having a control computer in a charging system in communication with a plurality of module processors, said module processors being associated with a module of cells of the battery, said method comprising the steps of:

said module processor isolating the module from the charging system;

said module processor monitoring voltages at each of the associated cell of the module of cells while the module is isolated;

said module processor providing the monitored voltages to the control computer;

said control computer receiving cell voltages from monitoring voltage by each module processor;

said control computer calculating a maximum cell voltage based on the cell voltages provided by the module processors;

said control computer providing said maximum cell voltage to said module processors prior to sending one of an equalize command and a charge command;

said module processor providing a requires equalization signal to the command computer when one associated cell has voltage above said maximum voltage established by the control computer;

said control computer sending a prepare for equalization command to said module processors after receiving said requires equalization signal from one said module processor;

said module processor waiting for one of a prepare to equalize command and a prepare to charge command from said control computer;

said control computer sending an equalization command to said module processors after receiving a prepared for equalization signal from said module processors;

said module processor determining which associated cells to equalize based on the monitored voltage at each of the associated cells;

said module processor equalizing the determined cells in the module for a predetermined period of time;

said module processor determining when the module has been completely equalized based on the monitored voltage at each of the associated cells;

said control computer awaiting receipt of an equalization complete signal from each of said module processors;

said module processor waiting for another command after determining that the module has been completely equalized;

said control computer providing a prepare to charge command to said module processors;

said module processor waiting for a prepare to charge command when voltage at one of the associated cells is below a predetermined voltage;

said control computer providing a charge command to said module processors after receiving a prepared to charge command from said module processors;

said module processor charging the associated cells after receiving a charge command from the command computer;

said control computer continuing charging while the module processors indicate that cells are below a predetermined voltage and a requires equalization signal has not been received;

said module processor halting charging of associated cells when a prepare to equalize command is received from the command computer and when one of the associated cells exceeds the maximum cell voltage;

said control computer providing a partial bypass command to said module processor during an associated charging cycle;

said module processor determining which associated cells to partially bypass based on the monitored voltage at each of the associated cells; and said module processor partially bypassing the determined cells during said associated charging cycle.

6. The method of claim 5 further comprising the steps of:

said module processor sending temperature data from said module to said control computer; and said control computer calculating said determined number of associated cells for equalization from said temperature data sent from said module processor.

7. An equalizing method for a battery having a control computer in a charging system in communication with a plurality of module processors, said module processors being associated with a module of cells of the battery, said method comprising the steps of:

said module processor isolating the module from the charging system during charging;

said module processor monitoring voltages at each associated cell of the module of cells while the module is isolated;

said module processor providing the monitored voltages to the control computer;

said control computer receiving cell voltages from monitoring voltage by each module processor;

said control computer calculating a maximum cell voltage based on the cell voltages provided by the module processors;

said control computer providing said maximum cell voltage to said module processors prior to sending an equalize command;

said module processor providing a requires equalization signal to the command computer when one associated cell has voltage above said maximum voltage established by the control computer;

said control computer sending a prepare for equalization command to said module processors after receiving said requires equalization signal from one said module processor;

said module processor waiting for a prepare to equalize command when one associated cell has voltage above said maximum voltage established by the control computer;

said control computer sending an equalization command to said module processors after receiving a prepared for equalization signal from said module processors;

said module processor determining which associated cells in the module to equalize based on the monitored voltage at each of the associated cells;

said module processor equalizing the determined cells in the module for a predetermined period of time;

said module processor determining when the module has been completely equalized based on the monitored voltage at each of the associated cells; and said control computer awaiting receipt of an equalization complete signal from each of said module processors;

wherein the step of determining which associated cells to equalize comprises the steps of:

sorting said associated cells by voltage;

selecting associated cells that exceed the maximum cell voltage level wherein the number of selected cells does not exceed the determined number of associated cells for equalization; and equalizing said selected cells during the step of said module processor equalizing the cells.

8. The method of claim 7 wherein said step of selecting cells selects cells exceeding said maximum cell voltage by the greatest amount before selecting cells exceeding said maximum cell voltage by lesser amounts.

9. The method of claim 8 wherein said step of sorting said associated cells and selecting said associated cells is performed by said control computer.

10. The method of claim 9 wherein said step of sorting said associated cells and selecting said associated cells is performed by said module processor.

11. An equalizing method for a battery having a control computer in a charging system in communication with a plurality of module processors, said module processors being associated with a module of cells of the battery, said method comprising the steps of:

said module processor isolating the module from the charging system during charging;

said module processor monitoring voltages at each associated cell of the module of cells while the module is isolated;

said module processor providing the monitored voltages to the control computer;

said control computer receiving cell voltages from monitoring voltage by each module processor;

said control computer calculating a maximum cell voltage based on the cell voltages provided by the module processors;

said control computer providing said maximum cell voltage to said module processors prior to sending an equalize command;

said module processor providing a requires equalization signal to the command computer when one associated cell has voltage above said maximum voltage established by the control computer;

said control computer sending a prepare for equalization command to said module processors after receiving said requires equalization signal from one said module processor;

said module processor waiting for a prepare to equalize command when one associated cell has voltage above said maximum voltage established by the control computer;

said control computer sending an equalization command to said module processors after receiving a prepared for equalization signal from said module processors;

said module processor determining which associated cells in the module to equalize based on the monitored voltage at each of the associated cells;

said module processor equalizing the determined cells in the module for a predetermined period of time;

said module processor determining when the module has been completely equalized based on the monitored voltage at each of the associated cells;

said control computer awaiting receipt of an equalization complete signal from each of said module processors;

said control computer providing a partial bypass command to said module processor during an associated charging cycle;

said module processor determining which associated cells to partially bypass based on the monitored voltage at each of the associated cells; and said module processor partially bypassing the determined cells during said associated charging cycle.

12. The method of claim 11 further comprising the steps of:

said module processor sending temperature data from said module to said control computer; and said control computer calculating said determined number of associated cells for equalization from said temperature data sent from said module processor.

13. A method for equalizing battery cell voltages in a battery of cells organized in a plurality of cell modules comprising the steps of:

collecting battery data including cell voltages, cell modules and local battery temperatures;

calculating a maximum cell voltage level for a single cell module from said battery data;

calculating a maximum number of cells for equalization in the single cell module based on local battery temperatures from said battery data;

sorting cell voltages associated with cells in the single cell module by voltage;

selecting cells in the single cell module that exceed the maximum cell voltage level wherein the number of selected cells is not more than the calculated number of cells for equalization and the selected cells have the highest cell voltages; and equalizing said selected cells.

14. A charging method for a battery of cells organized in a plurality of cell modules comprising the steps of:

collecting battery data including cell voltages, cell modules and local battery temperatures;

calculating a maximum cell voltage level for a single cell module from said battery data;

calculating a maximum number of cells for partial bypass in the single cell module based on local battery temperatures from said battery data;

sorting cell voltages associated with cells in the single cell module by voltage;

selecting cells in the single cell module that exceed the maximum cell voltage level wherein the number of selected cells is not more than the calculated number of cells for partial bypass and the selected cells have the highest cell voltages; and partially bypassing the selected cells during charging.

\* \* \* \* \*